US009220129B2

(12) United States Patent
Frederiksen et al.

(10) Patent No.: US 9,220,129 B2
(45) Date of Patent: Dec. 22, 2015

(54) COMMUNICATION METHOD AND SYSTEM

(75) Inventors: Frank Frederiksen, Klarup (DK); Klaus Ingemann Pedersen, Aalborg (DK); Vinh Van Phan, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 486 days.

(21) Appl. No.: 13/378,547

(22) PCT Filed: Jun. 15, 2009

(86) PCT No.: PCT/EP2009/057375
§ 371 (c)(1),
(2), (4) Date: Dec. 29, 2011

(87) PCT Pub. No.: WO2010/145687
PCT Pub. Date: Dec. 23, 2010

(65) Prior Publication Data
US 2012/0099508 A1    Apr. 26, 2012

(51) Int. Cl.
*H04W 4/00* (2009.01)
*H04W 92/20* (2009.01)
*H04W 92/12* (2009.01)
*H04W 92/24* (2009.01)
*H04W 92/16* (2009.01)

(52) U.S. Cl.
CPC .............. *H04W 92/20* (2013.01); *H04W 92/12* (2013.01); *H04W 92/16* (2013.01); *H04W 92/24* (2013.01)

(58) Field of Classification Search
CPC ............................... H04W 92/20; H04W 92/90
USPC ......................................................... 370/312
See application file for complete search history.

(56) References Cited

U.S. PATENT DOCUMENTS

| 2004/0221218 | A1* | 11/2004 | Grob et al. .................... 714/748 |
| 2005/0124348 | A1* | 6/2005 | Gaal et al. ..................... 455/450 |
| 2006/0019673 | A1* | 1/2006 | Yagyu et al. .................. 455/454 |
| 2006/0268791 | A1* | 11/2006 | Cheng et al. .................. 370/338 |
| 2006/0268804 | A1  | 11/2006 | Kim et al. ..................... 370/338 |
| 2008/0165727 | A1* | 7/2008 | Xiaoben et al. ............... 370/329 |
| 2008/0240072 | A1* | 10/2008 | Bykovnikov ................. 370/350 |
| 2008/0242301 | A1* | 10/2008 | Osterling et al. ............. 455/436 |
| 2009/0005052 | A1* | 1/2009 | Abusch-Magder et al. .. 455/446 |
| 2009/0034459 | A1* | 2/2009 | Shousterman et al. ....... 370/329 |
| 2009/0067369 | A1* | 3/2009 | Stamoulis et al. ............ 370/328 |
| 2009/0088167 | A1* | 4/2009 | Jalil et al. ..................... 455/442 |

(Continued)

FOREIGN PATENT DOCUMENTS

EP    2 028 907 A1    2/2009

OTHER PUBLICATIONS

R1-083103, 3GPP TSG RAN WG1 #54 Meeting, Jeju Island, Korea, Aug. 18-22, 2008, "Autonomous Component Carrier Selection for LTE-Advanced", Nokia Siemens Networks, Nokia, 4 pgs.

(Continued)

*Primary Examiner* — Guang Li
*Assistant Examiner* — Joe Combs
(74) *Attorney, Agent, or Firm* — Harrington & Smith

(57) ABSTRACT

A method of sending information from a first base station to other base stations including sending information to a first plurality of the base stations at a first time; and sending said information to a different plurality of the base stations at a later time according to a predetermined sending pattern for timing sending of said information to different pluralities of the base stations at different times.

22 Claims, 7 Drawing Sheets

(56) References Cited

U.S. PATENT DOCUMENTS

| | | | |
|---|---|---|---|
| 2009/0122782 A1* | 5/2009 | Horn et al. | 370/350 |
| 2009/0290518 A1* | 11/2009 | Gossain et al. | 370/310 |
| 2009/0296635 A1* | 12/2009 | Hui et al. | 370/328 |
| 2009/0310527 A1* | 12/2009 | Rao et al. | 370/315 |
| 2010/0039977 A1* | 2/2010 | Hikari et al. | 370/312 |
| 2010/0113076 A1* | 5/2010 | Westerberg et al. | 455/500 |
| 2010/0144365 A1* | 6/2010 | Pan et al. | 455/453 |
| 2010/0214939 A1* | 8/2010 | Ryan | 370/252 |
| 2010/0214943 A1* | 8/2010 | Immendorf et al. | 370/252 |
| 2010/0304743 A1* | 12/2010 | Jung et al. | 455/434 |
| 2011/0053598 A1* | 3/2011 | Ahluwalia | 455/436 |
| 2011/0085488 A1* | 4/2011 | Widegren | 370/312 |

OTHER PUBLICATIONS

R1-083733, 3GPP TSG RAN WG1 #54bis Meeting, Prague, Czech Republic, Sep. 29-Oct. 3, 2008, "Algorithms and results for Autonomous Component Carrier Selection for LTE-Advanced", Nokia Siemens Networks, Nokia, 6 pgs.

R1-091777, 3GPP TSG RAN WG1 #57 Meeting, San Francisco, USA, May 4-8, 2009, "Inter eNB Over-the-Air Communication (OTAC) for LTE-Advanced" 5 pgs.

* cited by examiner

COMMUNICATION METHOD AND SYSTEM

The present application relates to a method of communicating. In particular, but not exclusively limited to, the present application relates to coordinating communication of base stations in local area cellular communication.

A proposal for LTE-A (Long Term Evolution Advanced) radio systems is autonomous component carrier selection. In such systems, an arrangement of base stations, also referred alternatively as Node B or eNode-B, in a communication system such as a cellular communication system operate generally without central control. This is described in on-line documents R1-083733 and R1-083103 at http://www.3gpp.org.

An autonomous component carrier selection scheme has been proposed which relies on a concept where each base station automatically selects one of the component carriers as its primary carrier (also sometimes called the base carrier).

One proposal is for each base station to dynamically select additional component carriers or secondary component carriers for transmission/reception.

In order to have efficient autonomous component carrier selection at each base station, for example a Node B or eNode-B (eNB) some information from the neighbouring Node Bs is also needed by a Node B. This information is assumed to be available via inter eNode-B over-the-air communication (OTAC) for cases where there is no X2 interface between the eNode-Bs (i.e., typically in Home/Femto eNode-B deployment cases). X2 is a common interface used between eNode-Bs. For example, when implementing an automatic mechanism for component carrier selection coordinating use of frequencies is important.

Coordination of transmissions and/or receptions among the eNode-Bs, which are within the same local area cluster may be provided for inter eNode-B OTAC messages. Typically, an eNode-B is only able to receive an OTAC message from another eNode-B if it is not transmitting at the same time. This is generally the case for both frequency division duplexing (FDD) and time division duplexing (TDD).

In a first aspect of the present invention there is a method of sending information from a first base station to other base stations comprising:
   sending information to a first plurality of the base stations at a first time; and
   sending said information to a different plurality of the base stations at a later time according to a predetermined sending pattern for timing sending of said information to different pluralities of the base stations at different times.

Preferably the method comprises repeating sending the information to different pluralities of base stations until the first base station has sent the information to all the other base stations.

Preferably at least some of the base stations of the first and the different plurality of base stations are different.

Preferably the repeating comprises sending the information to the different plurality of the base stations having at least one base station different from another different plurality of base stations to which the information was sent at an earlier time.

Preferably the different plurality of the base stations comprises a portion of another different plurality of the base stations sending the information at an earlier time.

Preferably the different plurality of the base stations comprises half of the base stations sending information at the earlier time.

Preferably the sending occurs in sequential time intervals.

Preferably at least one time interval occurs between subsequent sending of the information.

Preferably each base station is configured to send/receive information to/from a plurality of base stations.

Preferably the plurality of base stations are within the same local area cluster.

Preferably the information comprising information relating to component carriers for a base station.

Preferably the information comprises one or more of the following: eNode-B measurements, measurements from active terminals attached to a cell of a base station, and information relating to component carriers of neighboring base stations and signaling information.

Preferably the signaling information includes information of the quality of component carriers of the first base station.

Preferably information relating to component carriers includes an indication of which component carriers have been selected by a neighboring base station.

Preferably the information are over the air communication messages.

Preferably the base station is one of an eNode-B, a home eNode-B and an access point.

In a second aspect of the invention there is a method of receiving information at a first base station from other base stations comprising:
   receiving information from a first plurality of the base stations at a first time; and
   receiving information from a different plurality of the base stations at a later time, according to a predetermined receiving pattern for timing of receiving information from different pluralities of the base stations at different times.

Preferably the method comprises repeating receiving information from different pluralities of base stations until all the other base stations have sent the information to the first base station.

Preferably at least some of the base stations of the first and the different plurality of base stations are different.

Preferably the repeating comprises receiving the information from the different plurality of the base stations having at least one base station different from another different plurality of base stations from which information was received at an earlier time.

Preferably the different plurality of the base stations comprises a portion of a plurality of the base stations receiving the information at an earlier time.

Preferably the different plurality of base stations comprises half of the base stations receiving information at the earlier time.

Preferably the receiving occurs in sequential time intervals.

Preferably at least one time interval occurs between subsequent receiving of information.

Preferably the information received from each base station is different.

In a third aspect of the present invention there is a method of communicating information between a first base station and other base stations comprising:
   sending information to a first plurality of the base stations at first time;
   receiving other information from the first plurality of the base stations at a second time;
   sending said information to a different plurality of the base stations at a later third time; and
   receiving the other information from the different plurality of the base stations in a later fourth time interval wherein the sending to and receiving from the different plurality of base stations is according to a predetermined sending and receiving pattern for timing of sending to and receiving from different pluralities of the base stations at different times.

Preferably the method further comprises repeating the sending and receiving until the first base station has sent the information to all the other base stations and all the other base stations have sent the other information to the first base stations.

Preferably at least some of the base stations of the first and the different plurality of the base stations are different.

Preferably repeating the sending and receiving comprises sending and receiving in subsequent time intervals.

Preferably the predetermined pattern of different pluralities of the base stations indicates which of the base stations are sending and receiving at different times.

Preferably the pattern changes at different times such that the sending or receiving state of a previous different plurality of the base stations is changed.

Preferably the pattern changes at different times such that the sending or receiving state of half of a previous different plurality of the base stations is changed.

In a fourth aspect of the present invention there is a computer readable medium comprising a computer program thereon, said computer program performing the method according any of the preceding aspects.

In a fifth aspect of the present invention there is an apparatus for sending information from a first base station to other base stations comprising:
  at least one processor;
  and at least one memory including computer program code;
  the at least one memory and the computer program code configured to with the at least one processor cause the apparatus to:
  send information to a first plurality of the base stations at a first time;
  send said information to a different plurality of the base stations at a later time according to a predetermined sending pattern for timing sending said information to different pluralities of the base stations at different times.

Preferably the apparatus is further configured to repeat sending the information to different pluralities of base stations until the first base station has sent the information to all the other base stations.

Preferably at least some of said first and second plurality of base stations being different.

Preferably the repeating comprises sending the information to the different plurality of the base stations having at least one base station different from another different plurality of base stations to which the information was sent at an earlier time.

Preferably the different plurality of the base stations comprises a portion of another different plurality of the base stations sending the information at an earlier time.

Preferably the different plurality of the base stations comprises half of the base stations sending information at the earlier time.

Preferably the sending occurs in sequential time intervals.

Preferably at least one time interval occurs between subsequent sending of the information.

In a sixth aspect of the present invention there is an apparatus for receiving information at a first base station from other base stations comprising:
  at least one processor;
  and at least one memory including computer program code;
  the at least one memory and the computer program code configured to with the at least one processor cause the apparatus to:
  receive information from a first plurality of the base stations at a first time; and
  receive information from a different plurality of the base stations at a later time according to a predetermined receiving pattern for timing receiving information from different pluralities of the base stations at different times.

Preferably the apparatus is further configured to repeat receiving information from different pluralities of base stations until all the other base stations have sent the information to the first base station.

Preferably at least some the base stations of the first and the different plurality of base stations are different.

Preferably the repeating comprises receiving the information from the different plurality of the base stations having at least one base station different from another different plurality of base stations from which information was received at an earlier time.

Preferably the different plurality of the base stations comprises a portion of a plurality of the base stations receiving the information at an earlier time.

Preferably the different plurality of base stations comprises half of the base stations receiving information at the earlier time.

Preferably the receiving occurs in sequential time intervals.

Preferably at least one time interval occurs between subsequent receiving of information.

Preferably the information received from each base station is different.

In an seventh aspect of the present invention there is an apparatus for communicating between a first base station and other base stations comprising:
  at least one processor;
  and at least one memory including computer program code;
  the at least one memory and the computer program code configured to with the at least one processor cause the apparatus to:
  send information to a first plurality of the base stations at a first time;
  receive other information from the first plurality of the base stations at a later second time;
  send said information to a different plurality of base stations at a later third time; and
  receive said other information from the different plurality of the base stations in a later fourth time interval wherein the sending to and receiving from the different plurality of base stations is according to a predetermined sending and receiving pattern for timing sending to and receiving from different pluralities of the base stations at different times.

Preferably the apparatus is further configured to repeating the sending and receiving until the first base station has sent the information to all the other base stations and all the other base stations have sent the other information the first base station.

Preferably at least some of the base stations of the first and the different plurality of the base stations are different.

Preferably the sending and/or receiving occurs in sequential time intervals.

Preferably at least one time interval occurs between subsequent sending and/or receiving of information.

In an eighth aspect according to the present invention there is a system for communicating between base stations comprising a plurality of apparatuses according to any of the fifth, sixth or seventh aspects.

In a ninth aspect according to the invention there is a method of sending information from a first base station to other base stations comprising:

sending radio resource information to a first plurality of the base stations at a first time; and sending radio resource information to a different plurality of the base stations at a later time according to a predetermined sending pattern for timing sending of the radio resource information to different pluralities of the base stations at different times to enable allocation of radio resources.

In a ninth aspect of the invention there is a method of sending information from a first base station to other base stations comprising:

sending radio resource information to a first plurality of the base stations at a first time; and sending radio resource information to a different plurality of the base stations at a later time according to a predetermined sending pattern for timing sending of the radio resource information to different pluralities of the base stations at different times to enable allocation of radio resources.

In a tenth aspect of the invention there is an apparatus for sending information from a first base station to other base stations comprising:

at least one processor;

and at least one memory including computer program code;

the at least one memory and the computer program code configured to with the at least one processor cause the apparatus to:

send radio resource information to a first plurality of the base stations at a first time;

send radio resource information to a different plurality of the base stations at a later time according to a predetermined sending pattern for timing sending the radio resource information to different pluralities of the base stations at different times to enable allocation of radio resources.

For a better understanding of the present invention and as to how the same may be carried into effect, reference will now be made by way of example only to the accompanying drawings in which.

The present invention is described herein with reference to particular illustrative embodiments. However, such embodiments are presented for the purposes of illustrating the present invention, and do not limit the scope thereof.

Figure 1:
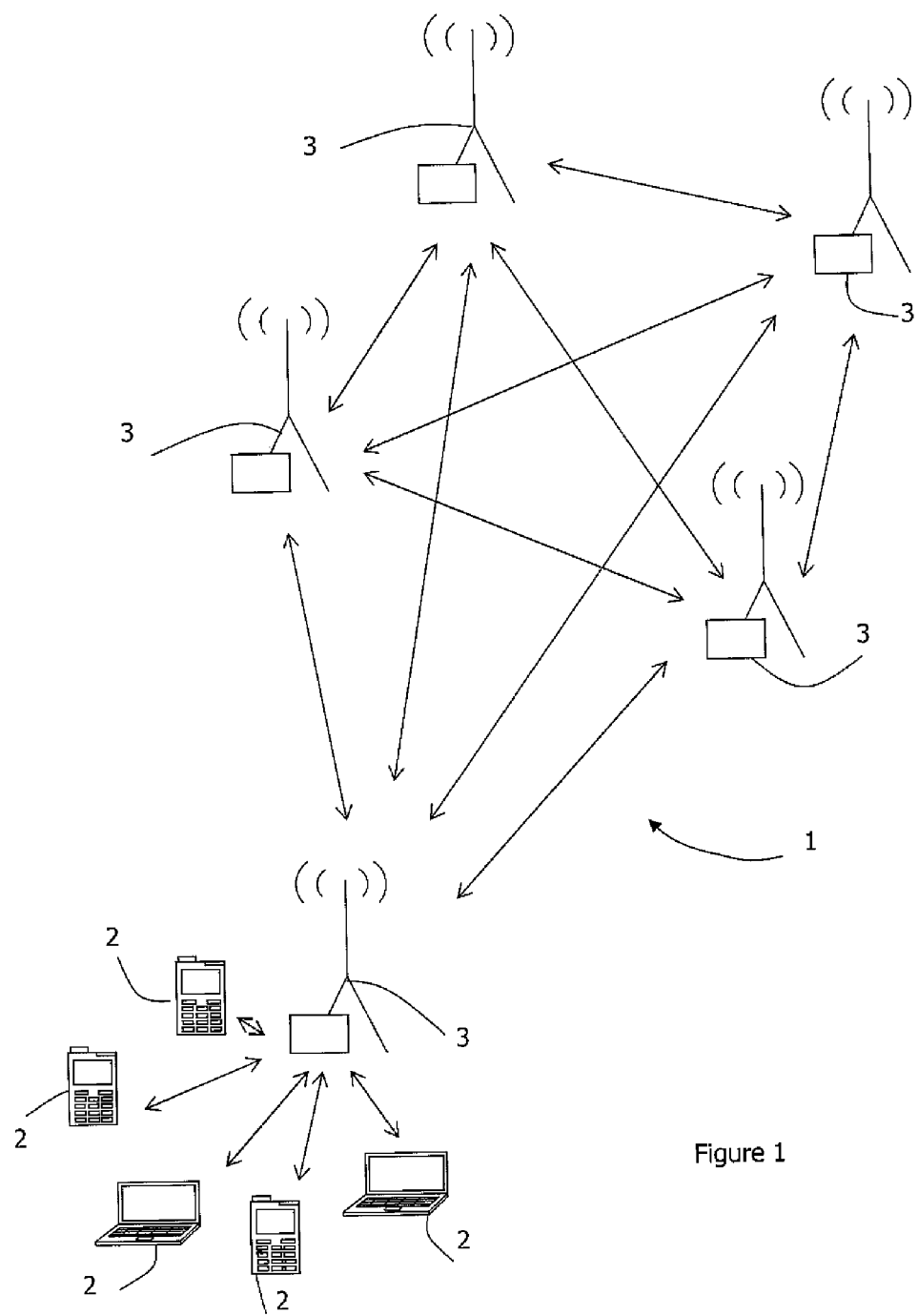
FIG. 1 illustrates a schematic representation of an LTE system.

FIG. 1 shows a communication system 1 providing wireless communications to a plurality of communication devices 2. Each communication device 2, for example a user equipment, is used for accessing various services and/or applications provided via the wireless communication system. The communication device 2 typically accesses wirelessly a communication system via at least one wireless transmitter and/or receiver of a base station 3 of an access system (not shown).

The user equipment 2 and base stations 3 communicate according to an appropriate radio access technology or technologies. Access is provided via radio channels also known as access channels. Each user equipment 2 may have one or more radio channels open at the same time. Furthermore, one or more user equipment 2 may be connected wirelessly to more than one base station 3 or similar entity. One or more user equipment 2 may also share a channel.

The base station 3 is connected to other parts of the communication system 1 via appropriate connections, by one or more appropriate gateway nodes (not shown).

Figure 2:
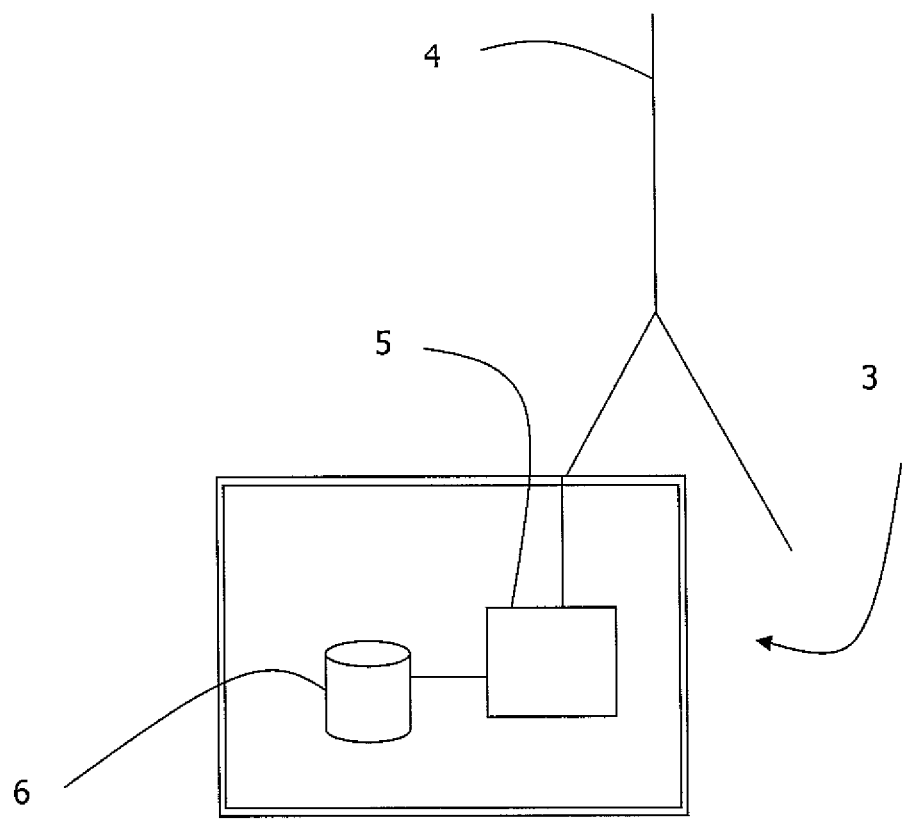
FIG. 2 illustrates a base station used in the LTE system of FIG. 1.

FIG. 2 shows a base station of the system of FIG. 1 in more detail. FIG. 2 shows exemplary architecture of the base station and the embodiments described hereinafter may comprise other arrangements and architectures. For example, the user device may communicate with a different access system.

The base station 3 has an antenna 4 for communicating with the communication devices or user equipment 2 via a wireless link. The base station 3 has a data processing entity 5 for carrying out various processes. Such processes may include some embodiments of the invention. Additionally a memory 6 is provided which stores information which is used by the base station 3.

Some embodiments utilise a long term evolution (LTE) radio system. The long term evolution (LTE) is a system which provides an evolved radio access system that is connected to a packet data system. Such an access system may be provided, for example, based on architecture from the Evolved Universal Terrestrial Radio Access (E-UTRA) and based on use of the Evolved Universal Terrestrial Radio Access Networks (E-UTRAN) Node Bs (eNode Bs). An Evolved Universal Terrestrial Radio Access Network (E-UTRAN) consists of E-UTRAN Node Bs (eNode-Bs) which are configured to provide base station and control functionalities. For example, the eNode-Bs can provide independently radio access network features such as user plane radio link control/medium access control/physical layer protocol (RLC/MAC/PHY) and control plane radio resource control (RRC) protocol terminations towards the user devices.

Hereinafter the term "base station" is used throughout the description. The term base station refers to any suitable access node. For example, non-limiting examples of access nodes in some embodiments are a base station of a cellular system, for example a 3G WCDMA Node B or eNode-B, a base station of a wireless local area network (WLAN), a satellite station of a satellite based communication system and other access points.

FIG. 1 further shows a schematic example of a particular type of autonomous cellular communication system which uses the communication method according to a first embodiment. The autonomous system or network includes a plurality of base stations 3. The base stations 3 are configured to communicate and serve user equipment, such as mobile telephones 2 in their respective cells. The base stations 3 communicate with each other via over the air communication (OTAC).

Typically, the arrangement of base stations as shown in FIG. 1 operates in both FDD and TDD mode, and is used in local area environments such as indoor scenarios, and outdoor hotspot areas with dense deployment of pico/micro cells. However the invention and embodiments are not limited to these local area environments.

In the arrangement as shown in FIG. 1, the LTE-Advanced system bandwidth consists of a number of separate component carriers. For example FIG. 1 shows five base stations 3. Typically an arrangement as shown in FIG. 1 may have a 100 MHz system bandwidth with five component carriers of 20 MHz. In one bandwidth configuration the five component carriers have a 20 MHz bandwidth. In this way, each of the five base stations 3 shown in FIG. 1 will have selected different component carriers for their primary component carriers as described below.

This means that if for instance a base station is silent, then it is able to receive parallel OTAC messages sent from all other base stations on different component carriers. However, due to the implementation of filtering and transceiving, a base station may not be able to receive on one component carrier while at the same time transmitting on the same component carrier or even other component carriers. However, other configurations such as e.g. four component carriers of 10 MHz, or sets of component carriers with different bandwidth sizes could be configured according to other embodiments.

The arrangement of base stations as shown in FIG. 1 may employ an autonomous eNode-B component carrier selection method for LTE-Advanced.

Figure 3:
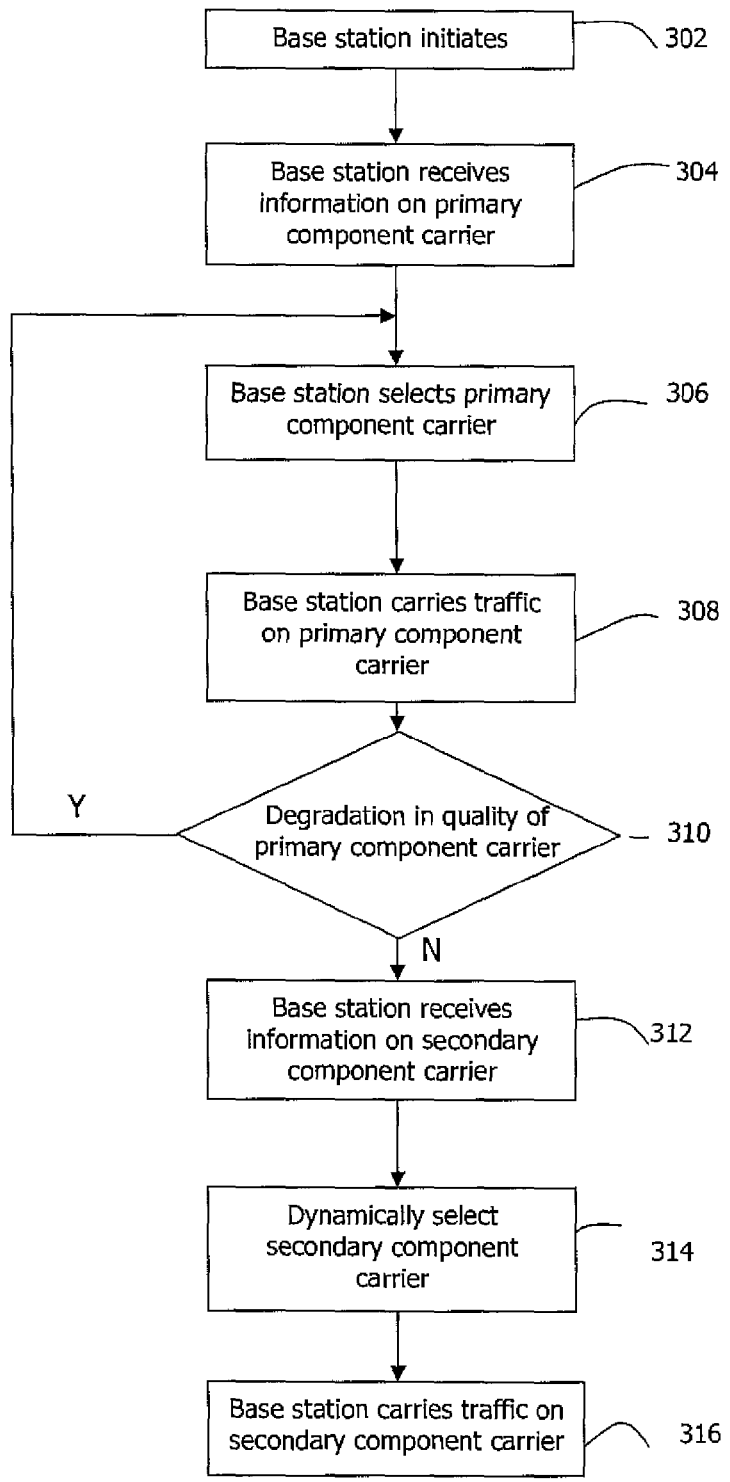
FIG. 3 illustrates a flow diagram of an eNode-B selecting component carriers in a first embodiment.

The autonomous eNode-B component carrier selection method according to the first embodiment of the present invention is illustrated in FIG. 3.

A base station, which in one embodiment is an LTE-Advanced (home) eNode-B 3, initiates when switched on as shown in step 302.

The base station 3 starts by selecting one of the component carriers as its primary component carriers as shown in step 306.

The base station 3 automatically selects one of the component carriers as a primary component carrier based on information of the component carriers. The information available for selection of the primary component carrier is typically local base station measurements. For example such measurements comprise the uplink received interference on each component carrier and potential information from surrounding active base stations 3 on which component carriers they have selected. The base station 3 receives the information of the component carriers as shown in step 304.

The primary/base carrier is assumed to be used for initial connection of terminals in the cell. A user equipment cannot connect to the base station 3 before the primary component carrier has been selected, and no signals are transmitted from the base station.

Once the base station 3 has selected its primary component carrier, the base station 3 starts to carry traffic as shown in step 308. The quality of the primary component carrier is hereafter monitored by the base station. If quality degradation of the primary component carrier is detected, then a reselection may be triggered, where another component carrier is selected as the primary as shown in step 310.

Since the amount of traffic in a cell and the mutual interference coupling with the surrounding cells can affect the performance when transmitting and/or receiving on all component carriers, an additional component carrier is also selected.

As the offered traffic increases for the cell, the base station 3 allocates additional secondary component carriers. Additional secondary component carriers are allocated if the performance of surrounding cells is not seriously degraded. A primary component carrier is the main component carrier for making and/or defining the cell. A secondary component carrier may be added or removed to extend the capacity of the cell.)

The base station 3 receives information on the secondary component carriers as shown in step 312 the available information is used for secondary carrier component selection or release by the base station 3. For example, a base station may release the secondary component carrier if the traffic load of the cell is low enough for not needing the secondary component carrier.

The information for the secondary component carrier may include at least one or more of local eNode-B measurements, measurements from active terminals attached to the cell, and additional information from the surrounding or neighboring base stations. The additional information may comprise information of which component carriers different neighboring base stations have selected for their respective primary and secondary component carriers. The information may further comprise signaling information indicating if a neighboring base station is experiencing quality degradation on certain component carriers.

The base station then dynamically selects an additional component carriers or secondary component carriers for transmission/reception as shown in step 314. A secondary component carrier is also referred to as an extended carriers. All component carriers not selected for primary or secondary component carriers are completely muted (uplink/downlink) and not used by the base station 3 for the cell.

Once the base station 3 has allocated additional secondary component carriers, the base station 3 starts to carry traffic as shown in step 316.

The information exchange between neighboring base stations as shown in FIG. 1 allows for example convergence in the selection of the component carriers that advantageously results in the optimal frequency re-use.

In some embodiments the information about neighboring base stations is sent and received using over-the-air communication messages between base stations. The over-the-air communication messages may be within the LTE-Advanced system bandwidth.

Advantageously, some embodiments may be used for propagating information in other self optimized networks (SON) including during initialization and self configuration of new home base stations that are initialized. In some embodiments, the information may be radio resource information. The propagation of the radio resource information throughout the network allows allocation of radio resources to base stations.

Figure 4:
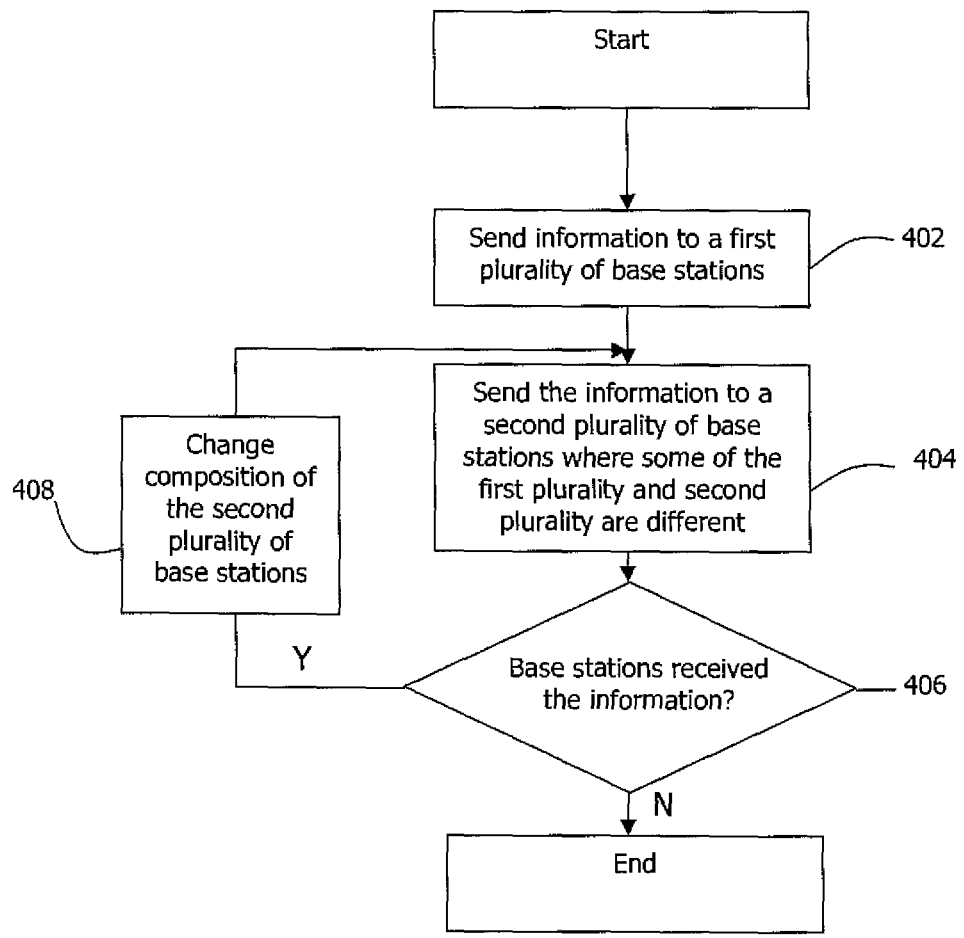
FIG. 4 illustrates a flow diagram of a method of sending information according to the first embodiment.

FIG. 4 shows a first embodiment of the method of sending information from a first base station to other base stations in more detail. In particular, FIG. 4 illustrates coordinating the transmission of OTAC messages from a base station 3 to a plurality of other base stations.

A base station 3 sends information to a first plurality of base stations as shown in step 402. As mentioned previously, typically the information comprises at least one or more of local base station measurements, measurements from active terminals attached to the cell, which component carriers different neighboring base stations have selected and signaling information. Alternatively or additionally the information comprises quality information of certain component carriers. Embodiments are not limited to this information and other information related to base stations or component carriers used by the base stations may be further included.

The information is sent to the first plurality of base stations at a first time interval. Typically the time interval is a system frame number. Other embodiments use other intervals of time such as time measurements (ms) or after a specific action takes place.

Figure 7:
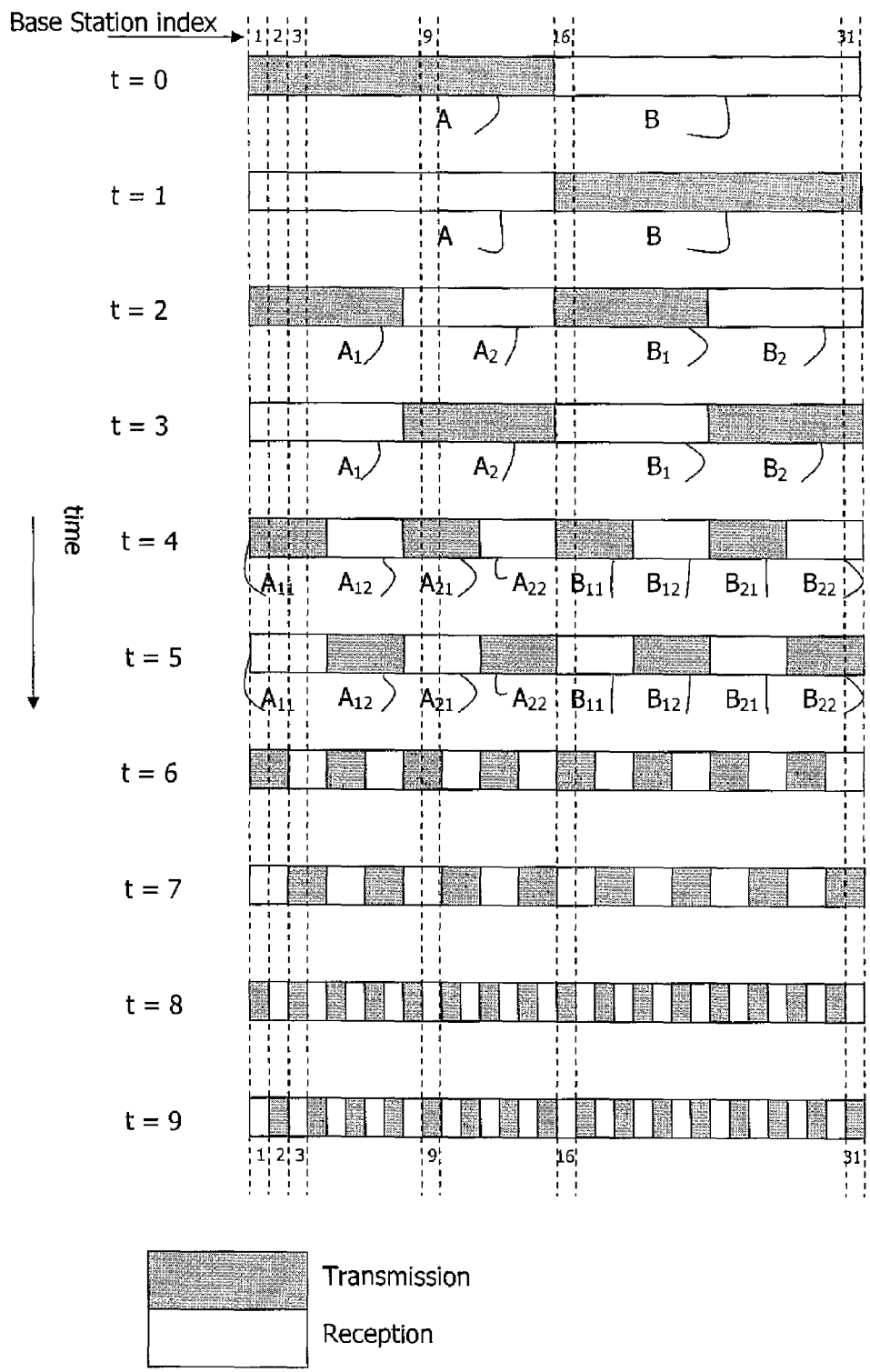
FIG. 7 illustrates a schematic representation of the timing a plurality of base stations communicating according another embodiment.

The process illustrated in FIG. 4 will be described in conjunction with FIG. 7. FIG. 7 shows the variation of sending and receiving states of thirty-two base stations over time.

The information sent in step 402 is sent from a set of base stations (A) which are in a sending state e.g. configured to send information such as OTAC messages. The particular base station which is sending is any one of the base stations in set A having the base station index 0 to 15 as show in FIG. 7 at time t=0. For example, base station #9 sends the information to a set (B) of base stations in a receiving state e.g. configured to receive information such as OTAC messages. The particular base stations which are receiving the information are the base stations in set B having the index 16 to 31 as shown in FIG. 7 at time t=0.

Once the information has been sent to the first plurality of base stations, the base station sends the information to a second plurality of base stations as shown in step 504. The base station sends the information to the second plurality of base stations at a later time interval. In some embodiments the later time interval is the next time interval, but there may be intervening time intervals between sending the information to the first plurality of base stations and sending the information to the second plurality of base stations. For example, FIG. 7 shows base station #9 sending information at time t=0 and then sending information at time t=3.

The second plurality of base stations have at least one base station different from the first plurality of base stations. In this way, the second plurality of base stations is a different plurality of base stations.

FIG. 7 shows that at t=3 base station #9 in subset $A_2$ sends the information to subsets $A_1$ and $B_1$. Base stations having the base station index 0 to 7 receive the information from base station #9 for the first time.

In this way, each time the base station transmits the information at least one base station receives the information for the first time. This means that each time the base station transmits the information to other base stations the information is propagated further in the local area of base stations.

If not all the base stations in the local area have received the information from the base station, then the base station continues to send information to the base stations in the local area.

The base station repeats the step of sending as shown in step 404. However, the composition of the second plurality of base stations is modified as shown in step 408. The second plurality of base stations is modified such that at least some of the base stations of the modified second plurality of base stations are different from the first plurality of base stations. Further at least some of the base stations of the modified second plurality of base stations are different from the second plurality of base stations. This means that at least one base station receives the information for the first time.

For example, base station #9 having sent the information to subsets $A_1$ and $B_1$ in time t=3 sends the information to different subsets at time t=4. Specifically at time t=4 base station #9 in subset $A_{21}$ sends the information to subsets $A_{12}$, $A_{22}$, $B_{21}$ and $B_{22}$.

The step of sending and changing the composition of the second plurality of base stations is repeated until the base station has sent the information, e.g. OTAC messages, to all the other base stations. In this case, then the base station does not need to continue sending the information as shown in step 406.

In some embodiments a plurality of base stations will be concurrently carrying out the method as shown in FIG. 4. In this way, the base stations in the first plurality of base stations will receive information from several base stations in the local area. In this case the information sent by different base stations will be different because the information will pertain to the particular base station which sent the information.

In other embodiments one base station will only be sending the information to the plurality of base stations.

FIG. 4 describes coordinated communication of a base station sending information to a plurality of base stations. Embodiments provide a coordinated sending and receiving scheme which provide coordinated sending and listening windows for base stations.

Advantageously, some embodiments are able to convey information between all base stations in a locality while still operating on a non-contention basis. This means that the number of messages sent over the air between base stations is reduced because a coordinated transmit and listening scheme reduces the amount of information lost over the network. This means that base stations may receive necessary information within the coverage area within a given time period.

Furthermore no base stations will be unable to receive an OTAC message for the reason that the base station was transmitting at the same time. In this way, the predetermined pattern of sending and receiving of base stations coordinates the base stations in a local area.

Some embodiments provide an improved component carrier selection concept for LTE-Advanced having a more efficient autonomous self adjusting frequency reuse mechanism for LTE-Advanced. For example the information received from other eNode-Bs may be used to select a frequency to reduce interference.

This may be beneficial for local area environments such as outdoor municipal hot spot areas and indoor pico/femto cell cases with uncoordinated (home) eNode-B deployment.

Figure 5:
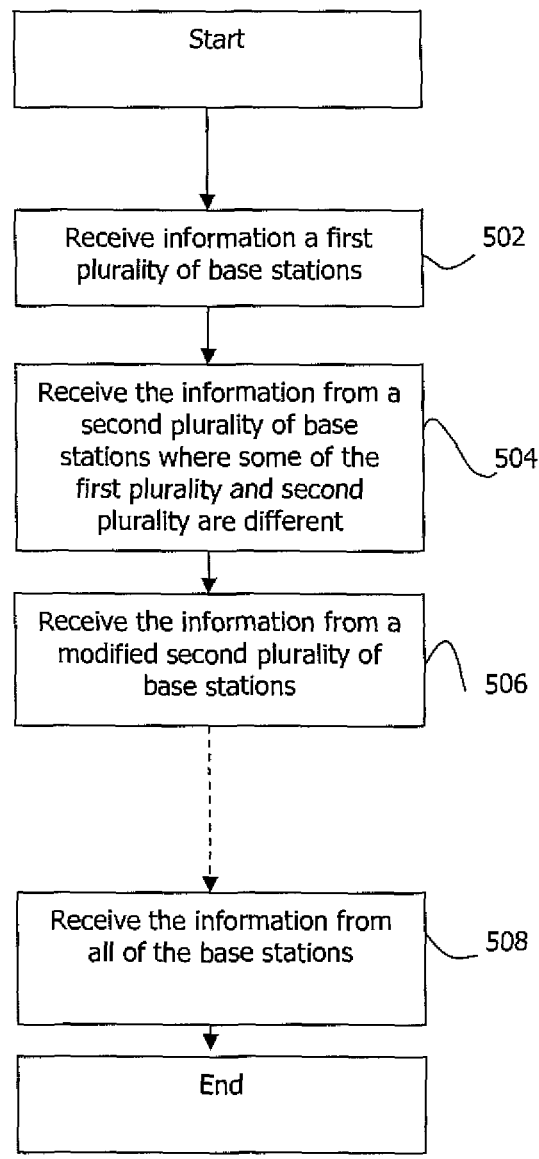
FIG. 5 illustrates a method of receiving information according to a second embodiment.

FIG. 5 shows a second embodiment of the method of receiving information from a first base station to other base stations in more detail. In particular, FIG. 5 illustrates coordinating the reception of OTAC messages between the base stations 3.

The other information is sent to the base station from a first plurality of base stations at a first time interval as shown in step 502. As before, the time interval is a system frame number. Other embodiments use other intervals of time such as time measurements (ms) or after a specific action takes place.

The other information is similar to the information sent by the base station as shown in FIG. 4. For example the other information are OATC messages. However, in contrast the base station is receiving the other information from a first plurality of base stations. In this way, the base station receives different information from each base station of the first plurality of base stations.

The process illustrated in FIG. 5 will be described in conjunction with FIG. 7. For example in reference to FIG. 7, a plurality of base stations (A) at time t=1 are in a receiving state and another plurality of base stations (B) are in a sending state.

Base station #9 at time t=1 will receive information from base stations 16 to 31 in set B.

Once other information has been received from the first plurality of base stations, the base station receives other information from a second plurality of base stations as shown in step 504. The second plurality of base stations send the information to the base station at a later time interval.

For example, FIG. 7 shows at time t=2 base station #9 receives information from base stations in subsets $B_1$ and $A_1$. In this way, base station #9 receives information from base stations in subset $A_1$ for the first time.

In some embodiments the later time interval is the next time interval, but there may be intervening time intervals between receiving the information from the first plurality of base stations and receiving the information from the second plurality of base stations.

Similar to the process shown in FIG. 4, the second plurality of base stations have at least one base station different from the first plurality of base stations. This means, each time the base station receives other information from neighboring base stations, the base station receives information from another base station for the first time.

In this way, each time the base station receives other information from other base stations the base station has more complete information with respect to neighboring base stations in the local area of base stations.

If not all the base stations in the local area have sent the information to the base station, then the base station continues to receive information from the base stations in the local area.

The base station repeats the step of receiving as shown in step 504. However, the composition of the second plurality of base stations is modified. The base station 3 receives information from the modified plurality of second base stations as shown in step 506.

The second plurality of base stations is modified such that at least some of the base stations of the modified second plurality of base stations are different from the first plurality of base stations. Further at least some of the base stations of the modified second plurality of base stations are different from the second plurality of base stations.

For example FIG. 7 shows that at time t=5, base station #9 receives information from the other base stations in a sending state in subsets $A_{12}$, $A_{22}$, $B_{12}$ and $B_{22}$.

The step of receiving other information from different compositions of the second plurality of base stations is repeated until all other information has been received from all the base stations as shown in step 508. In this case, the base station does not need to continue receiving the information.

In a further embodiment a first base station carries out both the processes of sending information to other bases stations and receiving other information from other base stations.

In this embodiment, the base station 3 sends information to a first plurality of base stations as shown in step 402 at a first time interval, for example t=0 as shown in FIG. 7. The base station then receives other information from the first plurality of base stations as shown in step 502 at a later time interval, for example t=1 as shown in FIG. 7.

Advantageously, the first plurality of base stations is the same for the step of sending the information to the first plurality of base stations and receiving information from the first plurality of base stations. In this way, the implementation of the pattern of sending and receiving states for all the base stations is simplified because less arranging of the base stations into groups is required.

The base station sends the information to a second plurality of base stations as shown in step 404, at some later time intervals, for example t=0+x (where x is greater than 1). The later time intervals occur later than the step 502.

The base station then receives other information from the second plurality of base stations as shown in step 504 at some later time intervals, for example t=1+x (where x is greater than 1).

In some embodiments the sending occurs before the receiving in a base station. However, in alternative embodiments the receiving occurs before the sending. Nevertheless, as mentioned above, the sending and receiving do not occur in the same time interval.

As discussed before, the steps of sending 404 the information to the second plurality of base stations and receiving 404 other information from the second plurality of base stations is repeated.

Similar to FIGS. 4 and 5 the composition of the second plurality of base stations is modified. The modified plurality of second base stations is the same for both the plurality of base stations which the base station is sending the information to and the plurality of base stations from which the base station is receiving the information.

The step of receiving other information from and sending the information to different compositions of the second plurality of base stations is repeated until all other information has been received from all the base stations.

In this way a plurality of base stations having alternating sending and receiving states are able to coordinate information propagation between base stations in the local area. Since all the base stations are sending and receiving information, all the base stations after the same number of sending and receiving steps will have complete information of the neighboring base stations in a local area.

Figure 6:
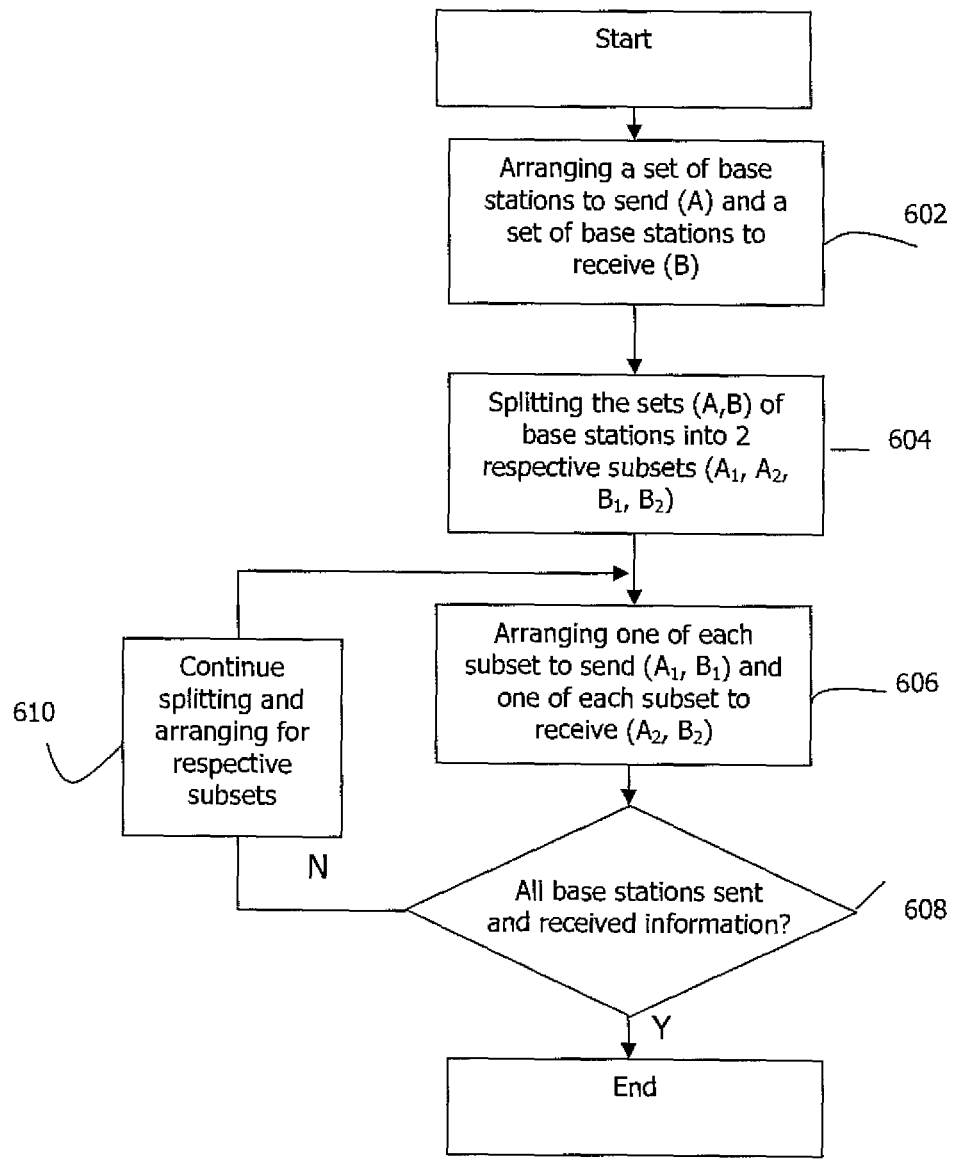
FIG. 6 illustrates a flow diagram of a method of sending and receiving according to another embodiment.

FIG. 6 illustrates steps of an algorithm exemplifying the arranging of the groups of base stations according to a predetermined pattern.

As discussed above, base stations in a local area are arranged into a first set (A) of base stations and a second set of base stations (B) as shown in step 602. This grouping of base stations is also shown in FIG. 7. One of the sets (A) of base stations is initially arranged to send information and the other set (B) is arranged to receive the information from set A at time t=0. In this way, a base station in set A sends information to the plurality of base stations in set B. In terms of FIG. 4, set B is the first plurality of base stations for anyone of the base stations in set A sending information to set B.

The base stations are then rearranged into different subsets of base stations as shown in step 604 according to the predetermined pattern. In particular each of the sets A and B are split into two respective subsets ($A_1$, $A_2$, $B_1$, and $B_2$).

After the sets have been split into respective subsets, a subset of each set is arranged to send ($A_1$, $B_1$) and receive ($A_2$, $B_2$) as shown in step 606. In this way at least some of the base stations arranged to send information in set A are arranged to receive other information. Likewise at least some of the base stations arranged to receive other information in set B are arranged to send information.

This means, a base station in subset $A_1$ sends information to base stations in subset $A_2$ and $B_2$ which are now in a receiving state. The base stations in subset $A_2$ will not have received the information from a base station in subset $A_1$ before because previously the base stations in subset $A_2$ were in a transmitting state and unable to receive information. In terms of steps 404 and 504, the second plurality of base stations comprises subsets $A_2$ and $B_2$. The second and first plurality have at least one differing base station because the base stations in subset $A_2$ are different from the base stations in set B.

If some of the base stations in the local area have not received information from some of the other base stations or some of the base stations have not sent information to other base stations then the second plurality of base stations are rearranged or modified again as shown in step 610 by repeating the steps of splitting 604 and arranging 606.

The subsets ($A_1$, $A_2$, $B_1$, and $B_2$) are each split similar to original sets A and B into further subsets (e.g. $A_{11}$, $A_{12}$ $A_{21}$, $A_{22}$, $B_{11}$, $B_{12}$, $B_{21}$ and $B_{22}$). The further subsets are then similarly arranged as discussed above for step 606.

The steps 604, 606 and 610 are repeated until all the base stations have sent and received information to/from all base stations.

FIG. 7 shows the variation of sending and receiving states of base stations over time according to the first and second embodiments. The different sets and subsets of base stations as described for FIG. 6 have been shown.

The pattern of transmission e.g. sending and listening e.g. receiving for base stations as shown in FIG. 7 is built in a similar way as a Walsh code tree is built.

FIG. 7 shows an example local area having a plurality of base stations where the total number of base stations (N_bs) is equal to 32. In other words, N_bs is the total number of base stations wanting to communicate with each other, for example this may be the number of base stations within common coverage area.

In certain embodiments the number of orthogonal transmit resources in the same transmit time interval is equal to at least N_bs/2. That is, a set of orthogonal resources that allows separation of information, for example the OTAC signals, from each active transmitting base station.

For example, if N_bs is equal to 32, then the minimum desired is 16. Nevertheless, in other embodiments the number of orthogonal transmit resources is more than N_bs/2 so that a plurality of base stations can send a plurality of OTAC messages to a plurality of listening base stations. The maximum number of transmit resources may be a designated practical limit greater than N_bs/2.

The designated practical limit may depend on detailed system specification and/or implementation.

The first half (set A) of the base stations transmit and the other half (set B) listen at time t=0.

For time t=1, the situation is swapped, such that the transmitting base stations are now listening, and vice versa for the listening base stations.

At time t=2, the listen/transmit pattern is modified, such that different base stations are transmitting to different listening targets. In particular, the first half (A) and the second half (B) are dividing in two providing four sets of base stations ($A_1$, $A_2$, $B_1$, and $B_2$). Then the transmitting and listening states of some of the base stations are modified. For example $A_1$ and $B_2$ are respectively changed from a listening state to a transmitting state and from a transmitting state to a listening state. In this way, some base stations are transmitting information to base stations which will receive the information for the first time.

The swapping and dividing of the groups of base stations continues for this example case for 10 time instances in total.

In some embodiments the total number of base stations is expanded to other maximum values of N_bs. Advantageously the total number of base stations is a power of two ($2^n$) because this simplifies implementation. Alternatively the total number of base stations is another number other than a power of two.

In this way, half of the total base stations in a local area are transmitting information in each transmission possibility, while the other half of the total base stations are listening for information.

In case a base station has information to transmit, it transmits the information in all transmit possibilities to ensure that all other base stations have received the message. That is, a base station sends the information to neighbouring base stations. The number of neighbouring base stations which the information is sent to may depend on the actual number of neighbouring base stations being involved in OTAC messaging that the base station is aware of and/or whether the neighbouring base stations are configured to belong to a set of base stations using OTAC messaging.

FIG. 7 illustrates sending and receiving states of base stations varying over time. The order of the sending and receiving may vary in other embodiments. For example the sets A and B of base stations (shown in at times t=0 and t=1 in FIG. 7) may send/receive after different subsets $A_1$, $A_2$, $B_1$, and $B_2$ of base stations send/receive (shown at times t=2 and t=3 in FIG. 7).

Preferably the sending and receiving states of a particular set are changed before the composition of a plurality of base stations is modified in order to reduce the number of times the base stations are rearranged into different sets.

The predetermined pattern of sending and receiving is exemplified in FIG. 7 with reference to base station #9.

At time t=0: base station #9 transmits on transmit resource (code #9). Base stations with index 16-31 will listen and receive the message. Base stations having index range 0-15 have not received the message yet at this point.

At time t=1: base station #9 listens for information from other base stations. At t=1 base station #9 receives information e.g. OTAC messages from base stations having index numbers 16 to 31.

At time t=2: base station #9 listens for information from other base stations. At t=2 Base station #9 receives information from base stations having index numbers 16 to 23 and 0 to 7.

At time t=3: base station #9 transmits on transmit resource (code #1). base stations having index numbers 0-7 and 16-23 listen and receive the message. Base stations having the index range 8-15 have not received the message at this point.

At time t=4: base station #9 transmits on transmit resource (code #5). Base stations having index 4-7, 12-15, 20-23, and 28-31 will listen and receive the message. Base stations having the index range 8-11 have not received the message at this point.

At time t=5: base station #9 listens for information from other base stations. At t=5 base station #9 receives information from base stations having index numbers 4-7, 12-15, 20-23, and 28-31.

At time t=6: base station #9 transmits on transmit resource (code #5). Base stations having index 2-3, 6-7, 10-11, 14-15, 18-19, 22-23, 26-27, and 30-31 will listen and receive the message. Base stations having range 8-9 have not received the message at this point.

At time t=7: base station #9 listens for information from other base stations. At t=7 base station #9 receives information from base stations having index numbers 2-3, 6-7, 10-11, 14-15, 18-19, 22-23, 26-27, and 30-31.

At time t=8: base station #9 listens for information from other base stations. At t=8 base station #9 receives information from base stations having index numbers 0, 2, 4, 6, 8, 10, 12, 14, 16, 18, 20, 22, 24, 26, 28, and 30.

At time t=9: for information from other base stations transmits on transmit resource (code #4). eNode-Bs with index 0, 2, 4, 6, 8, 10, 12, 14, 16, 18, 20, 22, 24, 26, 28, and 30 will listen and receive the message.

At time t=9 base station #9 has not received the message, but this is the transmitting base station, and already knows the information.

The above mentioned sending and receiving arrangement allows messages to be conveyed between all base stations near each other while still operating on a non-contention basis.

In this way some embodiments are capable of conveying information from transmitting base stations to all listening base stations within the limit of time interval=2*ceil(log 2(N_bs)) where N_bs is the total number of base stations and ceil is a ceiling function (where ceiling(x) is the smallest integer not less than x, where x is an integer). This also means each base station has to send the information (OTAC message) ceil(N_bs) times to make sure that all other base stations will have heard it.

In some embodiments non-contention based transmission of the OTAC messages is carried out in a compressed and coordinated mode, such that all the base stations are silenced, idled or muted for a limited period of time. In certain embodiments the base stations silenced, idled or muted according to a pre-defined pattern. In this way, it should be possible to ensure that the impact to ongoing hybrid automatic repeat request (HARQ) processes is low, while at the same time the time for transmitting updates is low.

In some embodiments, the pattern of listening by and transmitting to base stations of over the air communication messages between base stations is preset. That is, each base station has a predetermined pattern of listening and transmitting and each base station transmits or listens in a specified time window. The pattern of listening and transmitting is determined by the index code of the base station in the local area.

The pattern of listening by and transmitting to base stations may be preset following a distributed self-configuration process. For example the base stations in a locality may comprise a self organized network (SON). In this way, a centralized controller may assist with distributing the pattern of listening and receiving. When a base station is re-activated into a network of neighboring base stations, the re-activated or activated base station will be configured with particular OTAC transmit/receive patterns and resources. The OTAC transmit/receive patterns and resources for the re-activated base station are configured to coordinate with existing base stations in the network. In some embodiments the coordination is carried out by a central controller.

In other embodiments, the pattern of listening and transmitting of base stations the over the air communication messages between base stations is dynamically determined. For example, the base stations are connected to a controller, such as a radio network controller, which instructs the base stations to listen or transmit in real time.

In some embodiments the information sent or received from/by a particular base station is the same for each repeat sending of the information. For example, the parameters of component carriers for a base station may remain the same. In other embodiments the information changes and varies. If the information varies between repeat sending of the information, the base station repeats sending the information until all the other base stations receive the same information. For example, if content of the information changes and/or is updated at the sending base station node in a time period between two successive sending occasions, then the content of the information may vary.

It is noted that the embodiments of the invention and functionality may be provided according to some embodiments of the invention by a separate component to the data processing entity. In some embodiments the functionality of the methods according to some embodiments of the invention are carried out by other parts of a system separate from the base station. For example in an embodiment the functionality may be carried out by network controllers.

The present invention is described herein with reference to examples of preferred embodiments for the purpose of illustration, and is not limited to any such embodiments. The scope of the present invention is defined by the appended claims.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the base station, such as in the processor entity, or by hardware, or by a combination of software and hardware. Further in this regard it should be noted that any blocks of the logic flow as in the figures showing the flow diagrams of the sending and the receiving of the information (FIGS. 3, 4 and 5) may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuit (ASICs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

For example the present invention may be applied to base stations other than eNode-Bs.

However, all such and similar modifications of the teachings of this invention will still fall within the scope of this invention as defined in the appended claims.

The invention claimed is:

1. A method for enabling each one of a plurality of base stations to communicate with each of the rest of the plurality of base stations while operating on a non-contention basis, the method comprising:
   a) dividing the plurality of base stations into a first group and a second group;
   b) placing the first group of the plurality of base stations into a transmitting state and the second group of the plurality of base stations into a listening state for a first time interval;
   c) switching the first group of the plurality of base stations into the listening state and the second group of the plurality of base stations into the transmitting state for a second time interval;
   d) dividing the first group of the plurality of base stations into a first subgroup and a second subgroup, and the second group of the plurality of base stations into a third subgroup and a fourth subgroup;
   e) placing the first and third subgroups into the transmitting state and the second and fourth subgroups into the listening state for a third time interval;

f) switching the first and third subgroups into the listening state and the second and fourth subgroups into the transmitting state for a fourth time interval;

g) repeating the preceding steps d), e), and f) by further subdividing the subgroups, by placing the sub-subgroups obtained into transmitting and listening states, and by switching transmitting and listening states, for as many additional time intervals as are needed for each sub-subgroup to include only one base station.

2. The method according to claim 1, wherein the time intervals are sequential time intervals.

3. The method according to claim 1, wherein each base station is configured to send/receive information to/from a plurality of base stations.

4. The method according to claim 3, wherein the information is over the air communication messages.

5. The method according to claim 1, wherein each of the base stations is within one local area cluster.

6. The method according to claim 1, wherein, in a transmitting state, a base station sends information relating to component carriers for the base station, and, in a listening state, a base station receives information relating to component carriers for the base station.

7. The method according to claim 1, wherein, in a transmitting state, a base station sends, and, in a listening state, a base station receives information comprising one or more of the following: eNode-B measurements, measurements from active terminals attached to a cell of a base station, and information relating to component carriers of neighboring base stations and signaling information.

8. The method according to claim 7, wherein the signaling information includes information of the quality of component carriers of a base station.

9. The method according to claim 8, wherein information relating to component carriers includes an indication of the component carriers selected by a neighboring base station.

10. The method according to claim 1, wherein each of the base stations is one of an eNode-B, a home eNode-B, and an access point.

11. A computer program product comprising a non-transitory computer readable storage medium bearing computer program code embodied therein, wherein a processor coupled to the non-transitory computer readable storage medium executes the computer program code performing the method according to claim 1.

12. An apparatus comprising:
at least one processor; and
at least one memory including computer program code; the at least one memory and the computer program code configured, with the at least one processor, to cause the apparatus to perform a method for enabling each one of a plurality of base stations to communicate with each of the rest of the plurality of base stations while operating on a non-contention basis, the method comprising:
a) dividing the plurality of base stations into a first group and a second group;
b) placing the first group of the plurality of base stations into a transmitting state and the second group of the plurality of base stations into a listening state for a first time interval;
c) switching the first group of the plurality of base stations into the listening state and the second group of the plurality of base stations into the transmitting state for a second time interval;
d) dividing the first group of the plurality of base stations into a first subgroup and a second subgroup, and the second group of the plurality of base stations into a third subgroup and a fourth subgroup;
e) placing the first and third subgroups into the transmitting state and the second and fourth subgroups into the listening state for a third time interval;
f) switching the first and third subgroups into the listening state and the second and fourth subgroups into the transmitting state for a fourth time interval;
g) repeating the preceding steps d), e), and f) by further subdividing the subgroups, by placing the sub-subgroups obtained into transmitting and listening states, and by switching transmitting and listening states, for as many additional time intervals as are needed for each sub-subgroup to include only one base station.

13. The apparatus according to claim 12, wherein the time intervals are sequential time intervals.

14. A system for communicating between base stations comprising a plurality of apparatuses according to claim 12.

15. The apparatus according to claim 12, wherein each base station is configured to send/receive information to/from a plurality of base stations.

16. The apparatus according to claim 15, wherein the information is over the air communication messages.

17. The apparatus according to claim 12, wherein each of the base stations is within one local area cluster.

18. The apparatus according to claim 12, wherein, in a transmitting state, a base station sends information relating to component carriers for the base station, and, in a listening state, a base station receives information relating to component carriers for the base station.

19. The apparatus according to claim 12, wherein, in a transmitting state, a base station sends, and, in a listening state, a base station receives information comprising one or more of the following: eNode-B measurements, measurements from active terminals attached to a cell of a base station, and information relating to component carriers of neighboring base stations and signaling information.

20. The apparatus according to claim 19, wherein the signaling information includes information of the quality of component carriers of a base station.

21. The apparatus according to claim 20, wherein information relating to component carriers includes an indication of the component carriers selected by a neighboring base station.

22. The apparatus according to claim 12, wherein each of the base stations is one of an eNode-B, a home eNode-B, and an access point.

* * * * *